Aug. 13, 1963 T. F. CARTER 3,100,818

COMMUNICATION SYSTEMS

Filed Nov. 6, 1959

2 Sheets-Sheet 1

INVENTOR
Thomas F. Carter

BY Hastings Ackley
ATTORNEY

Aug. 13, 1963 T. F. CARTER 3,100,818

COMMUNICATION SYSTEMS

Filed Nov. 6, 1959 2 Sheets-Sheet 2

INVENTOR.
Thomas F. Carter
BY
C. Hastings Ackley
ATTORNEY 3,100,818
Patented Aug. 13, 1963

3,100,818
COMMUNICATION SYSTEMS

Thomas F. Carter, 6762 Greenville Ave., Dallas, Tex.

Filed Nov. 6, 1959, Ser. No. 851,367
1 Claim. (Cl. 179—1)

This invention relates to communication systems and more particularly to a device for interconnecting a telephone system with a two-way radio system.

An object of this invention is to provide a new and improved interconnecting device for permitting a person employing a telephone system to converse with a person employing a two-way radio system.

Another object is to provide an interconnecting device for use between a telephone and a two-way radio base station including a transmitter and receiver whereby a conversations may be carried on between a person calling in to the telephone at the base station and a person employing a second two-way radio.

Still another object is to provide an intercommunicating device employable with a base two-way radio station including a transmitter and a receiver which causes the transmitter to be made operative when the person remote from the base station speaks to a telephone at the base station and which causes the transmitter to become inoperative when the person ceases to speak over the telephone.

A further object is to provide an interconnecting device between a telephone and a base two-way radio which transmits the audio signals impressed on the speaker coil of a telephone handset to the transmitter of the base radio and simultaneously renders the transmitter operative to transmit the audio signals to a second two-way radio station remote from the base station.

A still further object is to provide an interconnecting device wherein the transmitter is rendered inoperative and causes audio signals recevied by the receiver to be transmitted to the microphone of the telephone hand set.

Another object is to provide an interconnecting device which functions automatically and without the attention of the base station operator during the carrying on of a conversation being transmitted through the interconnecting device between a telephone system and a radio system.

Still another object of the invention is to provide an interconnecting device which is provided with a speaker to permit the operator of the base two-way radio to monitor the conversation transmitted between a telephone system and a radio system.

Additional objects and advantages of the invention will be readily apparent from the reading of the following description of a device constructed in accordance with the invention, and reference to the accompanying drawings thereof, wherein.

Figure 1:
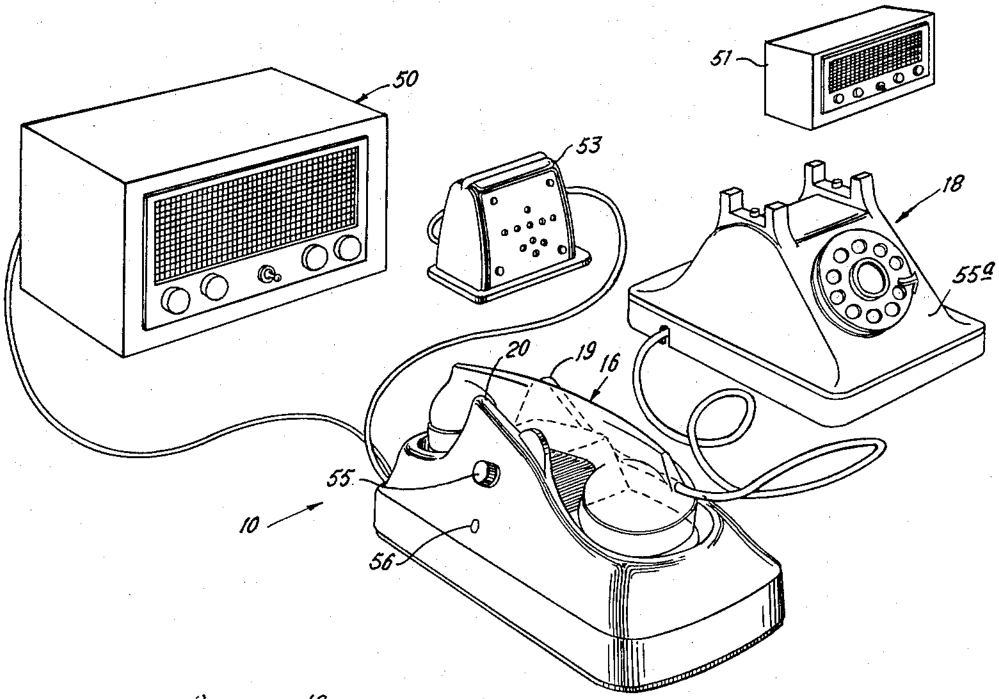
FIGURE 1 is a perspective view of the interconnecting device shown in use with the handset of a telephone and a base two-way radio.
Figure 2:
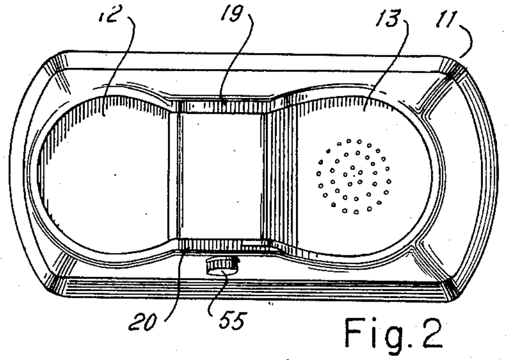
FIGURE 2 is a top plan view of the interconnecting device.

Referring now to the drawings, the interconnecting device 10 includes a console or housing 11, preferably of plastic molded construction, having a pair of upwardly opening recesses 12 and 13 in which are receivable the earpiece 14 and the mouthpiece 15 of the handset 16 of a telephone 18. The console is provided with a pair of laterally spaced upwardly extending flanges 19 and 20 between which is disposable the handle 25 of the handset which connects the earpiece and the mouthpiece. The earpiece of the telephone handset is provided with the usual inductive speaker coil 26 which, when energized with a varying or audio modulated voltage, moves a diaphragm 27 to reproduce the voice of a person whose voice has been transformed into the varying voltage and transmitted over telephone lines to the telephone set 18. The mouthpiece 15 of the telephone set is provided with the usual carbon microphone 28 whereby sounds are converted into variations in voltage which are transmitted through the telephone system to the earpiece of another telephone handset. It will be apparent that the hand set described is of the usual conventional type.

The interconnecting device includes a pickup coil 30 mounted in the console adjacent to the earpiece of the handset when the handset is cradled in the console or housing 11 in order that the pickup coil 30 be inductively coupled with the coil 26 of the handlet so that a voltage will be induced in the pickup coil 30 which will vary in accordance with the variations in the voltage of the current flowing in the telephone speaker coil 26.

A speaker 35 is mounted in the console adjacent the microphone 28 of the handset, when the handset is cradled on the console, so that the sounds generated by the speaker 35 may be picked up by the microphone 28 and converted into variations in the voltage of a current flowing in the usual manner. The speaker 35 may include a drive coil 36 which drives a suitable diaphragm 37 to translate variations in electrical voltage into sound waves.

Figure 3:
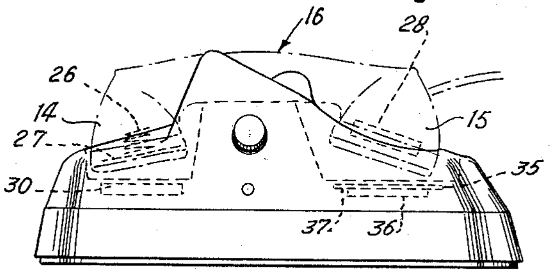
FIGURE 3 is a side view of the interconnecting device.

It will thus be apparent that when the handset is cradled in the console in the manner illustrated in FIGURES 1 and 3, the variations in the voltage of the current flowing in the drive coil 26 of the diaphragm 27 of the receiver of the telephone handset 16 generate a voltage in the pickup coil 30 which varies in accordance therewith and that when the coil 36 of the speaker 35 is energized by a current which varies in accordance with the sounds produced by a person, the diaphragm 37 of the speaker 35 vibrates in the conventional manner to reproduce the sounds which are then detected by the microphone 28 of the mouthpiece 15 and transformed into a current which varies in accordance with these sounds.

The pickup coil 30 and the speaker coil 36 are connected through a suitable control circuit to the conventional or usual two-way radio base station 50 in such manner that the electrical signals or variations in the voltage induced in the pickup coil 30 are broadcast by means of the transmitter of the base station and whereby the audio modulated signals detected by the receiver of the base station from another transmitter remote from the two-way station are sent to the speaker 35 to energize the latter and cause the audio signals to be changed into sound waves. A telephone conversation may be carried on between a person employing a telephone system and a person utilizing a two-way radio system because a voltage of the telephone system which varies in accordance with the sounds produced by a person is reproduced by means of the pickup coil 30 of the interconnecting device and broadcast by means of the transmitter of the base station 50 and received by the receiver of the remote radio station 51. The voice of the person employing the remote station 51 is transmitted by means of the transmitter of the remote station and picked up by the receiver of the base station and is caused to energize the speaker coil 36 of the speaker 35 which then reproduces the voice of the person at the remote two-way radio station which is then picked up by the microphone 28 of the handset 16 and transmitted over the telephone system to the person utilizing the telephone system.

The control circuit of the interconnecting device 10 also includes a speaker 53 whereby the operator of the base two-way radio station may listen in and monitor the conversation between the two persons and to remove the handset 15 from the console when the conversation is ended. The base operator, of course, may hear the voice of the person utilizing the remote station on the usual speaker of the base station.

It will be apparent that when an incoming call is received on the telephone set 18, the operator at the base station 50 removes the handset 25 from the base 55 of the telephone set, determines from the caller that he wishes to speak to a person at the remote station 51, which may be a mobile unit in an automobile or other vehicle, and then turns on the interconnecting device by actuating the switch 55 of the console. When the switch is turned on a light 56 is activated so that the operator knows that the interconnecting device is operative. The operator then places the handset on the console in the manner indicated in FIGURES 1 and 3. A telephone conversation can then take place between the person calling in through the telephone set 18 and the person at the remote or mobile two-way radio station 51. When the conversation is ended, the operator removes the handset from the console and places it back on the telephone base 55.

Figure 4:
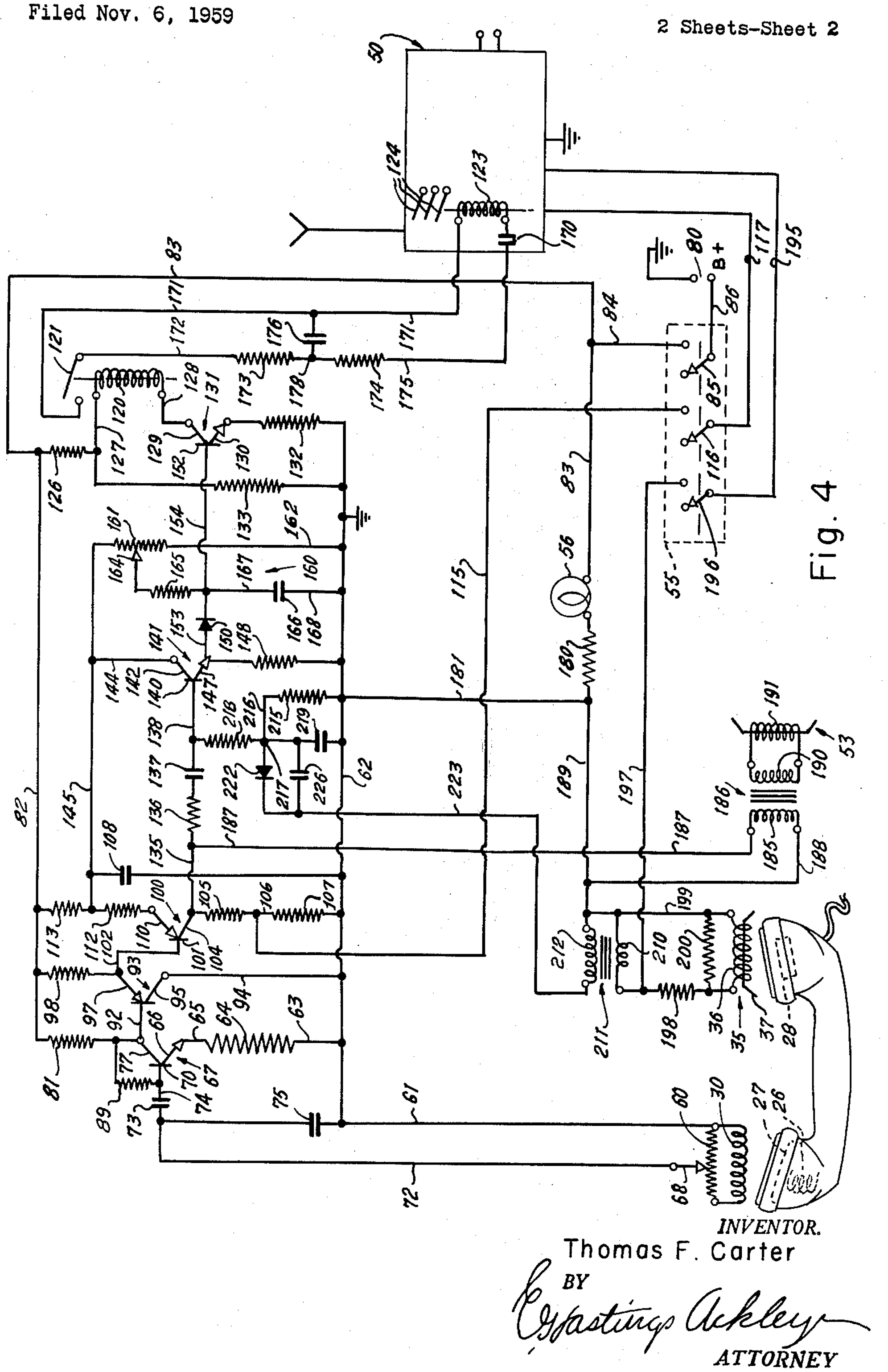
FIGURE 4 is a schematic diagram of the control circuit of the interconnecting device.

Referring now particularly to FIGURE 4, the pickup coil 30 of the interconnecting device has a resistor 60 connected thereacross. One end of the pickup coil 30 is connected by the conductors 61, 62 and 63, the resistor 64 and the conductor 65 to the emitter 66 of a transistor 67. The adjustable contact 68 which contacts the resistor 60 is connected to the base 70 of the transistor 67 via the conductor 72, the coupling capacitor 73 and the conductor 74. A capacitor 75 may be connected between the juncture of the conductor 72 and the capacitor 73 and between one end of the pickup coil 30. It will thus be apparent that the variations in the voltage induced in the pickup coil 30 are impressed across the base and the emitter of the transistor 67 to vary its conductivity in accordance therewith and to cause it to act as an amplifier. The amplitude of the variations in the voltage impressed on the transistor may be adjusted by means of the adjustable contact 68.

The collector 77 of the transistor 67 is connected to the positive side of a source of direct current or input circuit 80 through a current limiting resistor 81, conductors 82, 83 and 84, the contact 85 of the switch 55 when the switch is in its closed condition and the conductor 86. The emitter 66 of the transistor 67 is connected to the opposite side of the input circuit 80 through the resistor 64, the conductors 63 and 62 and ground. Resistor 89 may be connected between the juncture of the resistance 81 and the collector and the juncture of the base and the coupling capacitor 73.

The collector 77 is connected to the base 92 of a transistor 93 and the emitter 66 is connected through the conductor 65, the resistance 64, and the conductors 63, 62 and 94 to the collector 95 of the transistor 93 to vary the conductivity of the transistor 93 in accordance with the conductivity of the transistor 67. The transistor 93 of course is employed to provide a second stage of amplification for the variations in the potential of the pickup coil 30. The collector 97 of the transistor 93 is connected to one side of the input circuit 80 through a current limiting resistance 98, the conductors 82, 83 and 84, the movable contact 85 of the switch 55 and the conductor 86.

A transistor 100 provides a third stage of amplification for the varying potential induced in the pickup coil 30 and has its base 101 connected to the emitter 97 through the conductor 102 and its collector 104 to the collector 95 through the resistance 105, the conductor 106, the resistance 107 and the conductors 62 and 94. The emitter 110 is connected to one side of the input circuit 80 through the resistances 112 and 113, the conductors 82, 83 and 84, the movable contact 85 and the conductor 86. The collector 104 is connected to the other side of the input circuit 80 through the resistors 105 and 107 and ground. A capacitor 108 is connected across the resistance 112, the emitter 110, the collector 104 and the resistances 105 and 107. The audio signals or variations in the potential generated in the pickup coil 30 are transmitted to the transmitter 50 through a conductor 115, which is connected to the common juncture of the resistances 105 and 107, the movable contact 116 of the multiple switch 55 and the conductor 117. It will thus be seen that the transistors 67, 93 and 100, together with their associated circuitry, are employed as a three stage amplifier for amplifying the variations in the voltage induced in the pickup coil 30 and transmitting such amplified audio signals or voltage variations to the transmitter 50 for broadcast by the latter.

In order that the transmitter be "keyed" or placed on the air whenever the speaker coil 26 of the handset 16 is energized by incoming audio signals or variations in voltage, a relay coil 120 is energized to close the contact 121 and energize a relay winding 123 of the radio transmitter to place it on the air. The relay coil 120 is connected across the input circuit 80 when the switch contact 85 is closed through the conductor 86, the contact 85, the conductors 84 and 83, the current limiting resistance 126, the conductors 127 and 128, the collector 129 and emitter 130 of the transistor 131, the resistor 132, the conductor 62 and through ground to the other side of the input circuit. A resistance 133 is connected in series with the resistance 126 across the conductors 82 and 62 to act in conjunction therewith as a voltage divider.

The transistor 131 acts in a switching capacity to connect the relay winding 120 across the input circuit 80 whenever audio signals are transmitted to the coil 26 of the speaker of the handset 16. In order to accomplish this result, the collector 104 of the transistor 100 is connected through a conductor 135, the resistor 136, the coupling capacitor 137 and the conductor 138 to the base 140 of a transistor 141 which provides a fourth stage of amplification for the varying potential induced in the pickup coil 30. The collector 142 of the transistor 141 is connected to one side of the input circuit 80 through the conductors 144 and 145, the current limiting resistance 113, the conductors 82, 83 and 84, the movable contact 85 and the conductor 86. The emitter 147 of the transistor 141 is connected to the other side of the input circuit 80 through the resistance 148, the conductor 62 and ground. A uni-directional conducting device or rectifier 150 is connected between the emitter 147 of the transistor 141 and the base 152 of the switching transistor 130 by means of conductors 153 and 154.

In order to prevent the transistor 131 from being rendered conductive due to spurious or momentary variations in the voltage induced in the pickup coil 30 or otherwise introduced into the circuit, a time delay circuit 160 is provided which includes a variable resistance 161 which is connected across the input circuit 80 by means of the conductor 86, the movable switch contact 85, the conductors 84, 83 and 82, the resistance 113, the conductors 145, 162, 62 and ground. The movable contact 164 of the variable resistance 161 is connected to one side of a resistance 165 and whose other side is connected to the conductor 154 and to one side of a capacitor 166 through the conductor 167. The opposite side of the capacitor 166 is connected to the other side of the input circuit 80 through conductors 168 and 62. It will now be apparent that whenever varying voltages are induced in the pickup coil 30, the conductivity of the transistor 141 varies in accordance therewith and causes uni-directional pulses of current to flow through the rectifier 150 to the base 152 of the switching transistor 131. The capacitor 166 acts as a storage device to prevent the rise of the potential across the base and emitter 130 to the predetermined value necessary to cause the transistor 131 to become conductive until the capacitor is charged to a predetermined potential. Since the resistances 165 and 161 permit leaking of the charge, the variations in the voltage induced in the pickup coil 30 must continue for a predetermined period of time, which may be adjusted to any predetermined value by setting the movable contact 164 at an appropriate position on the variable resistance 161, before the capacitor charges to the proper potential and thus causes the switching transistor 131 to become fully conductive.

When the transistor 131 becomes fully conductive, the relay winding 120 energizes and causes the movable contact 121 to move to closed position and connects the relay winding 123 of the transmitter 50 across a suitable source of electric current, shown as a battery 170, through the conductors 171 and 172, resistors 173 and 174 and the conductor 175. A capacitor 176 is connected between the conductor 171 and the common juncture or connection 178 of the resistors 173 and 174 to prevent chatter of the relay 121.

The signal light or lamp 56 which is illustrated as of the filament type, but which could be of the neon type, is connected across the input circuit 80 through the conductors 86, the switch contact 85, the conductors 84 and 83, the resistance 180, conductors 181 and 62 and ground. It will thus be apparent that the lamp or light 56 will glow or light whenever the switch 55 is closed.

The primary winding 185 of a transformer 186 is connected across the input circuit 80 through the conductor 86, the switch contact 85, the conductors 84, 83, 82, the resistances 113 and 112, the emitter 110 and collector 104 of the transistor 100, and the conductors 135, 187, 188, 189, 181 and 62 and ground. The secondary winding 190 of the transformer 186 is connected across the winding or coil 191 of the speaker 53 so that the voices of the persons engaged in conversation will be heard by the operator.

The coil or winding 36 of the speaker 35 is connected to the receiver of the base station 50 through a conductor 195, the movable contact 196 of the switch 55, the conductor 197, the resistor 198, the conductors 199, 189, 181 and 62 and ground. A resistance 200 is connected across the winding 36.

It will thus be seen that when the switch 55 is moved to its closed position, the three contacts 85, 116 and 196 are moved to their closed positions and that when the speaker coil 26 of the handset is energized with voltage which varies in accordance with the voice of a person, the pickup coil 30 has current induced therein whose voltage varies in accordance with such voice signals and that the output of the pickup coil 30 is amplified to cause the relay contact 121 to move to closed positions to key or place the transmitter on the air and at the same time cause the amplified audio signal or varying voltage to be conducted to the transmitter and broadcast. When the audio signals or varying voltages are ceased to be transmitted to the speaker coil 26 of the handset 16, the relay contact 121 moves to its open position and the voltage from the receiver of the base station 50, which varies in accordance with audio signals or speech, is transmitted to the speaker coil 36 to cause the diaphragm 37 of the speaker 35 to vibrate in accordance therewith and reproduce the voice sounds. These sounds are picked up by the microphone 28 of the handset 16 and transmitted through the telephone system to the person calling in to the base station.

The speaker coil 26 of the conventional handset has induced therein an audio modulated or varying voltage by the microphone whenever the latter is energized by sound and the speaker coil, of course, induces a similarly varying voltage in the pickup coil which would then place the transmitter on the air.

In order to insure that the relay contact moves to its open position whenever the receiver of the base station is receiving the voice signals of a person broadcasting from the remote two-way radio station 51, the primary winding 210 of a transformer 211 is connected across the speaker coil 36 of the console through the resistance 198 and the conductor 199. The secondary winding 212 of the transformer 211 is connected through the conductors 189, 181, the resistor 215 and the conductor 216, and the common connection 217 of a resistance 218 and a capacitor 219, the opposite ends of the resistor 218 and the capacitor 219 are connected respectively to the conductor 138 and the conductor 62. A rectifier 222 is connected between the common juncture 217 of the resistances 218 and 215, the capacitor 219, and the other side of the secondary winding 212 by a conductor 223. A second capacitor 226 may be connected across the rectifier 222 having its opposite ends connected to the conductor 223 and to the common juncture 217. When a varying voltage is applied across the speaker coil 36 of the console from the receiver of the two-way radio station 50, a voltage is simultaneously induced in the secondary winding 212 which is applied to the base and emitter of the transistor 141 to counter-balance the voltage from the pickup coil which is tending to render the transistor conductive. As a result the transistor is cut off and ceases conducting. As a result whenever an audio modulated voltage is impressed across the speaker winding 36, the transistor 141 is caused to become non-conductive and consequently to cause the relay winding 120 to be de-energized and cause the relay winding 121 to open.

It will now be seen that a new and improved interconnecting device for use between a telephone system and a two-way radio system has been illustrated and described which includes a pickup means or coil 30 for producing a potential which varies in accordance with the voice signals, or audio modulated voltage being transmitted to the earpiece 14 of a telephone handset, an amplifying means such as the transistors 67, 93 and 100 for amplifying such voltage and transmitting it to a radio transmitter of a two-way radio transmitter. It will further be seen that an additional amplifying means 141 is provided for actuating a switching transistor, such as the transistor 131, for rendering the switching transistor fully conductive simultaneously to energize a relay winding 123 of the transmitter to actuate various relay contacts 124 of the transmitter to "key" the transmitter or place it on the air.

It will further be seen that a time delay circuit 160 is interposed between the switching transistor 131 and the amplifier transistor 141 in order to prevent the closing of the relay contact 121 due to spurious voltages appearing in the circuit or due to extraneous noise signals or variations in the voltage of the speaker coil 26 of the handset 16 which are of short duration.

It will further be seen that a circuit which includes the rectifier 222 and the capacitor 219 is operatively connected with the speaker coil 36 and the receiver to render the transistor 141 non-conductive whenever an audio modulated voltage is impressed across the speaker coil 36 of the console from the receiver of the two-way radio station 50 to insure that the transmitter is taken off the air whenever the receiver is operative.

It will further be seen that the control device includes a console forming a cradle for a head set having an earpiece 14 and a mouthpiece 15, that the pickup coil 30 is disposed adjacent the speaker coil 26 of the earpiece 14 of the head set whereby a voltage which varies in accordance with the variations in the audio modulated voltage is induced in the pickup coil whenever the voltage of the speaker coil 26 of the earpiece is energized with audio modulated voltage, and that the speaker 35 of the console is adjacent the microphone 28 whereby the sounds produced by the speaker 35 are picked up by the microphone 28 for transmittal through the telephone system in the usual manner.

It will further be seen that the interconnecting device 10 for interconnecting a telephone system with a two-way radio system requires a minimum of attention by the operator at the base station since the operator merely has to place the handset of the telephone on the console whereupon the interconnecting device automatically places the transmitter on the air whenever the person calling in through the handset is speaking and automatically disconnects or takes the transmitter off the air when the person calling in on the handset ceases speaking.

It will further be seen that the operator, due to the provision of the speaker 53, is immediately made aware of the end of the conversation and can then replace the handset on the telephone base thus freeing the operator's time for other duties while the conversation is taking place.

It will further be seen that a means has been provided to insure that the transmitter is removed from the air whenever the person broadcasting from the remote station is speaking.

The foregoing description of the invention is explanatory only, and changes in the details of the construction illustrated may be made by those skilled in the art, within the scope of the appended claim, without departing from the spirit of the invention.

What is claimed and desired to be secured by Letters Patent is:

An interconnecting device including: a pickup coil disposable adjacent a speaker coil energized by an audio modulated current, the audio modulated current of the speaker coil producing a potential in said pickup coil which varies in accordance with said audio modulated current; first means for amplifying the potential produced in said pickup coil and transmitting it to a transmitter for broadcast thereby; and means responsive to the output of said amplifying means for placing said transmitter on the air, said last mentioned means comprising a second amplifier means connected to said first amplifier means, relay means, switch means for energizing said relay means to place said transmitter on the air, said switch means being energized by said second amplifier means; and time delay means connected between said second amplifier means and said switch means to permit energization of said switch means only after the voltage produced in said pick-up coil persists for a predetermined period of time.

References Cited in the file of this patent

UNITED STATES PATENTS

| | | |
|---|---|---|
| 1,891,299 | Anderson et al. | Dec. 20, 1932 |
| 2,018,464 | Nebel | Oct. 22, 1935 |
| 2,079,089 | Varley | May 4, 1937 |
| 2,295,153 | Bjornson | Sept. 8, 1942 |
| 2,528,636 | Cisin | Nov. 7, 1950 |
| 2,539,139 | Jordanoff et al. | Jan. 23, 1951 |
| 2,657,304 | Parks | Oct. 27, 1953 |
| 2,696,529 | Bachelet et al. | Dec. 7, 1954 |
| 2,766,324 | Peth | Oct. 9, 1956 |
| 2,831,923 | Block | Apr. 22, 1958 |